May 5, 1936.  T. W. LOWE  2,039,967
METHOD OF MANUFACTURING PIPE CAPS
Filed March 27, 1935   2 Sheets-Sheet 1
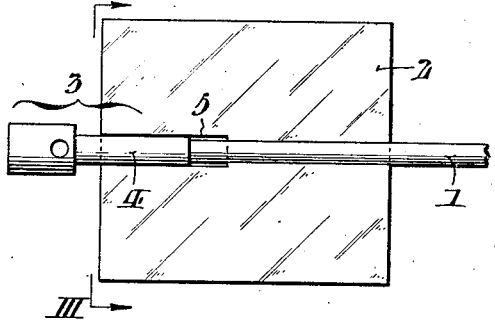
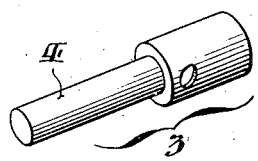
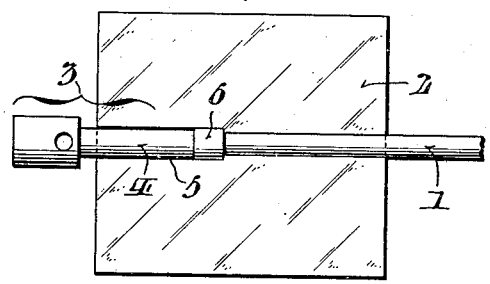
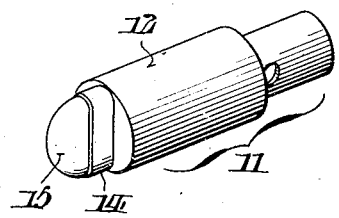
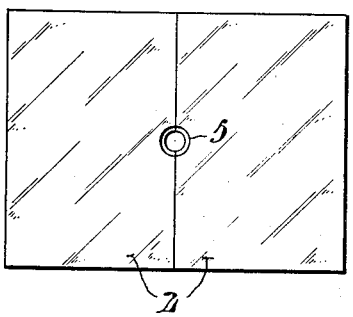
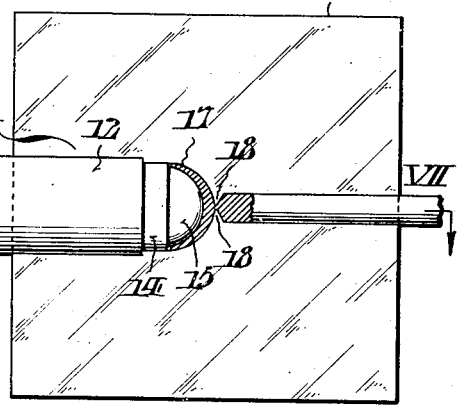
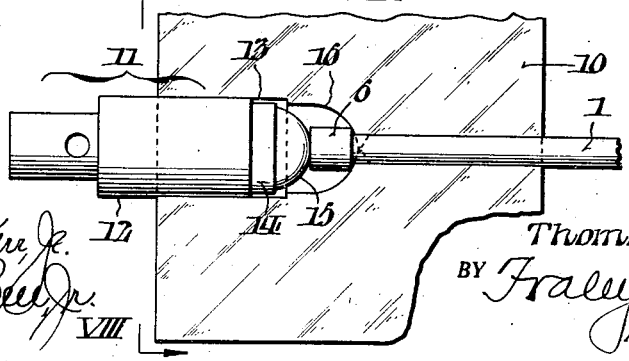
WITNESSES:
Thomas W. Kerr Jr.
William Bell Jr.
INVENTOR:
Thomas W. Lowe,
BY Fraley & Paul
ATTORNEYS.

May 5, 1936. T. W. LOWE 2,039,967
METHOD OF MANUFACTURING PIPE CAPS
Filed March 27, 1935   2 Sheets-Sheet 2
FIG. VII.
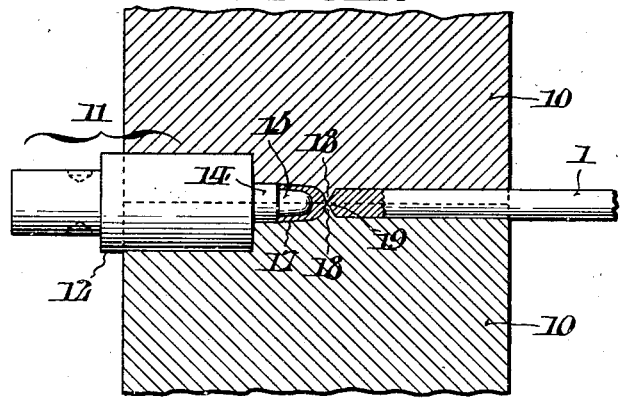
FIG. VIII.
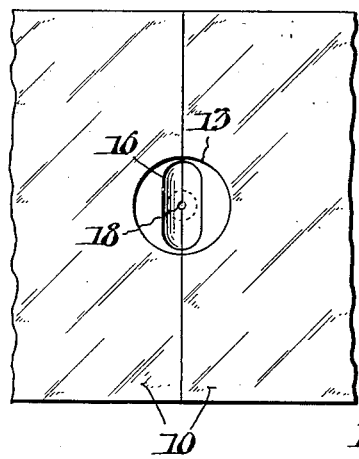
FIG. X.
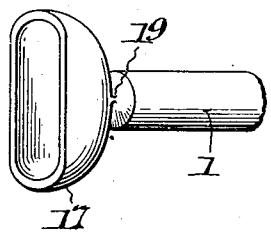
FIG. XI.
FIG. XII.
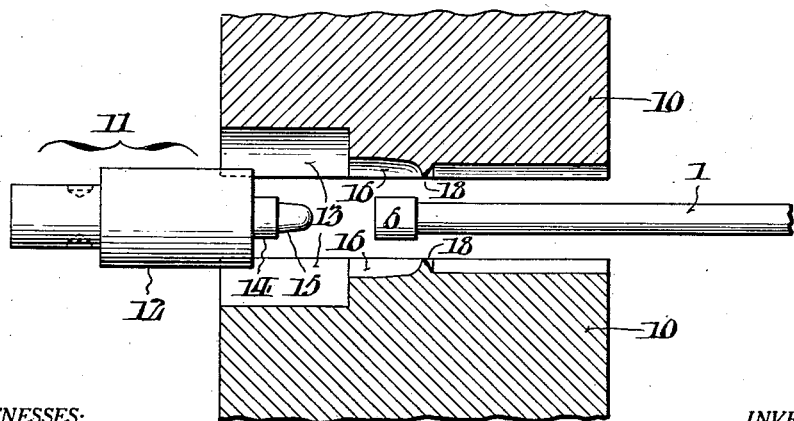
WITNESSES:
Thomas W. Kerr, Jr.
William Bell, Jr.
INVENTOR:
Thomas W. Lowe,
BY Fraley Paul
ATTORNEYS.

Patented May 5, 1936

2,039,967

UNITED STATES PATENT OFFICE 2,039,967

METHOD OF MANUFACTURING PIPE CAPS

Thomas W. Lowe, Columbus, Ohio

Application March 27, 1935, Serial No. 13,247

2 Claims. (Cl. 29—157.6)

This invention relates to a method of manufacturing caps for pipe bends, and is particularly adapted to the making of pipe bends for locomotive superheaters, though it may be applied to many other like purposes.

In my pending application for U. S. Letters Patent, Serial No. 13,248, filed March 27, 1935, I have described a method of manufacturing pipe bends which involves the forging and uniting of a pair of tubular sections to form a return bend body, and the subsequent application of a cap to the return bend body by means of an autogenous weld. My present invention relates to an improved method of making the type of return bend cap there shown, or an article of similar nature.

The objects of the invention are to simplify the operations involved in the manufacture of return bend caps or the like, to reduce the cost thereof, and at the same time to form the cap in such manner that when applied to pipe bends, it has substantial strength and presents a smooth unobstructed passage for the flow of steam.

Other more specific objects and advantages characterizing my invention will become more fully apparent from the description hereinafter set forth of one embodiment or example of the practice of the invention, having reference to the accompanying drawings. Of the drawings:

Fig. I represents a side elevation of one of the dies of a die-forging machine, showing a bar placed therein in readiness for upsetting in accordance with the first step of the process.

Fig. II represents a similar view, showing the action of the plunger in upsetting the bar to form an enlarged head thereon.

Fig. III represents an end elevation of the pair of dies used for the upsetting operation, taken as indicated by the lines III—III of Fig. I, omitting the plunger.

Fig. IV represents a perspective view of the plunger used for the upsetting operation.

Fig. V represents a side elevation of one of the second set of dies used in the die forging machine, showing the upset bar in readiness for the second forging step of the process.

Fig. VI represents a similar view, showing the action of the plunger used for forging the enlarged head of the bar to cap-shaped formation.

Fig. VII represents a cross section of the pair of dies used for the above mentioned operation, taken as indicated by the lines VII—VII of Fig. VI.

Fig. VIII represents an end elevation of the same, taken as indicated by the lines VIII—VIII of Fig. V.

Fig. IX represents a perspective view of the plunger used in the second forging operation.

Fig. X represents a perspective view of the cap and bar at the completion of the second forging operation.

Fig. XI represents a side elevation of the finished cap with the bar broken off; and, Fig. XII represents a view similar to Fig. VII, but showing the dies, plunger, and upset bar in spaced apart relation to reveal more clearly the detailed construction of the parts.

In the drawings there is shown an example of the invention as applied to the manufacture of return bend caps for locomotive superheaters. The first step of the process consists in heating a metal bar 1 in a furnace. When the bar 1 is heated to the desired temperature, by means of tongs or like instrumentalities, it is inserted, as shown in Fig. I, between a pair of dies 2 of a die-forging machine. When first inserted in the die-forging machine, the bar occupies the position shown in Fig. I. The plunger 3 employed for the first step of the operation is preferably formed with a cylindrical body 4 which fits within a correspondingly shaped cylindrical cavity 5 formed between the dies 2. When the plunger 3 of the die-forging machine is operated to deliver a blow upon the end of the bar 1, it upsets the same and forms at the end thereof an enlarged head 6, in the manner represented in Fig. II.

Upon the completion of the upsetting operation, the bar 1, still heated to high temperature, is placed within additional dies 10, as shown most clearly in Fig. V, for a second forging operation. The plunger 11 associated with the dies 10 has an enlarged cylindrical body 12 which fits within a correspondingly shaped cylindrical cavity 13 formed between the dies 10. In advance of the body 12, the plunger 11 is provided with a substantially oval shaped shoulder 14, and from this shoulder there projects forwardly a crowned head 15 which is adapted to strike the enlarged head 6 of the metal bar 1. The cavity 16 between the dies 10 which accommodates the enlarged head 6 of the bar 1 is so formed that upon impact with the plunger 11, the metal of the enlarged head is transformed to the shape of a cap as indicated at 17 in Figs. VI, X and XI. By means of the oval shaped shoulder 14 of the plunger 11, extrusion of the metal is confined to the cavity 16. Accordingly, by proper design of the dies 2 employed in the upsetting operation, the head 6 of the metal bar 1 may be given the desired volume of metal to completely fill the space defined between the cavity 16 of the dies 10 and the crowned head 15 of the plunger 11.

As most clearly shown in Figs. VI, VII and XII, the dies 10 are each provided with a sharp cutting edge 18 which pinches the bar shank at its juncture with the enlarged head 6 as an incident to the closing of the dies. Accordingly, upon closing of the dies 10 around the bar 1, the enlarged head 6 thereof is not only transformed to the shape of a cap, but it is partially, though not completely, severed from the shank of the bar. Thus at the completion of the second forging operation, the article produced will take the form represented in Fig. X, the cap portion 17 being connected to the shank of the bar 1 by a narrow tongue of metal 19. The shank of the bar 1 may, therefore, be used as a handle facilitating the removal of the parts from the dies 10 of the machine. By striking the cap portion 17 with a blow, this portion may easily be separated from the shank of the bar 1.

From the above description it will be observed that the pinching of the shank of the bar at its juncture with the enlarged head 6 forms an incident to the operation of the die-forging machine, thus avoiding the necessity of a separate cutting off operation. It will also be observed that the two forging operations serve to compact the metal, and thus to give added strength to the return bend cap, which is the critical region of the pipe bend.

While I have described one example of the practice of my invention showing particular forms of dies used for the several operations involved in the manufacture of a return bend cap for locomotive superheaters, it will be apparent that numerous changes may be made in the form of the apparatus employed, and that the invention has obvious application to the making of pipe caps for other purposes; and such changes are within the spirit of the invention as defined in the annexed claims.

Having thus described my invention, I claim:

1. A method of manufacturing pipe caps of the character described which consists in heating a metal bar, upsetting the end thereof to form an enlarged head, and die-forging said enlarged head to mould and transform the same, to the shape of a rounded cap, incidentally pinching the bar shank about its longitudinal axis at its juncture with the enlarged head as the cap is rounded into shape whereby the shank may be readily severed from the cap.

2. A method of manufacturing pipe caps of the character described which consists in heating a metal bar, upsetting the end thereof to form an enlarged head, inserting the bar within forging dies, the closure of said dies pinching the bar shank about its longitudinal axis at its juncture with the enlarged head as the cap is rounded into shape, and forging the enlarged head to mould and transform the same to the shape of a rounded cap, whereby at the completion of the forging operation the shank may be readily severed from the cap.

THOMAS W. LOWE.